United States Patent
Papst et al.

[11] 3,766,416
[45] Oct. 16, 1973

[54] INTERNALLY INSULATED, METAL ENCLOSED ELECTRIC MOTOR

[75] Inventors: Hermann Papst; Georg Papst, both of Black Forest, Germany

[73] Assignee: Papst-Motoren KG, Schwarzwald, Germany

[22] Filed: May 15, 1972

[21] Appl. No.: 252,975

[30] Foreign Application Priority Data
May 15, 1971 Germany.................. P 21 24 229.5

[52] U.S. Cl. ............................. 310/43, 310/254
[51] Int. Cl. ............................................ H02k 1/04
[58] Field of Search ............... 310/43, 45, 42, 211, 310/260, 62, 63, 284, 258, 89

[56] References Cited
UNITED STATES PATENTS

| | | | |
|---|---|---|---|
| 2,852,470 | 9/1958 | Henne | 310/45 |
| 3,075,250 | 1/1963 | Strohm | 310/260 |
| 3,508,327 | 4/1970 | Diederichs | 310/42 |
| 3,242,361 | 3/1966 | Varner | 310/211 |
| 3,639,789 | 2/1972 | Bednarski | 310/43 |
| 3,246,187 | 4/1966 | Iemura | 310/43 |
| 3,413,715 | 12/1968 | Latussek | 310/42 |
| 3,497,735 | 2/1970 | Diederichs | 310/42 |
| 3,135,885 | 6/1964 | Maynard | 310/43 |
| 2,761,985 | 9/1956 | Schaefer | 310/45 |
| 2,611,930 | 9/1952 | Hill | 310/45 |

Primary Examiner—R. Skudy
Attorney—Flynn & Frishauf

[57] ABSTRACT

A layer of insulating material, preferably a tube of insulating material extends around the outside of the stator laminations, completely surrounding the stator laminations from end face to end face; pre-formed insulating end caps, in the form of hollowed rings cover the end loops of the windings extending beyond the stator to form, together with the insulating sleeve, a continuous insulating covering layer. The electromagnetically active elements of the rotor are insulated from the rotor shaft by means of a sleeve which can extend, beyond the end faces of the rotor, in a conical flare to provide completely insulated end faces. The outer insulating sleeves can be covered with metal enclosures.

10 Claims, 12 Drawing Figures

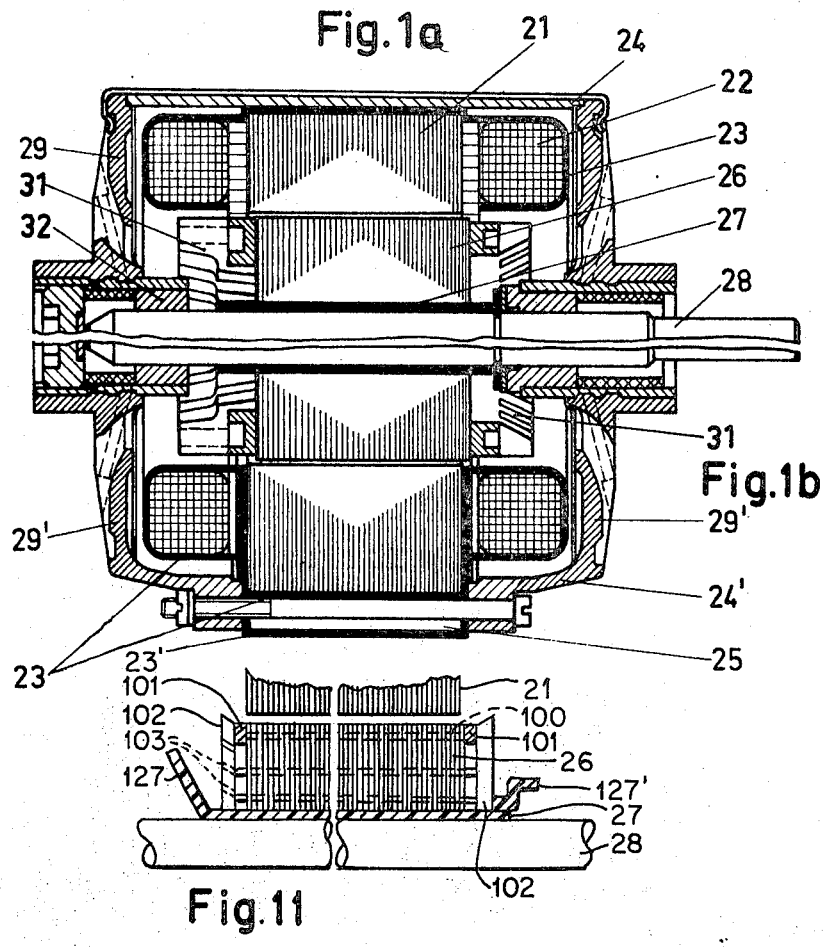
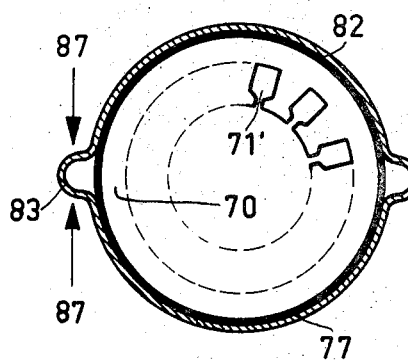

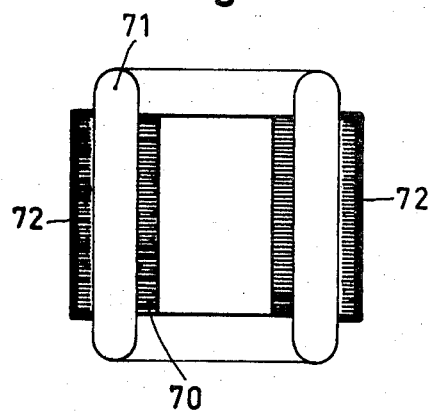
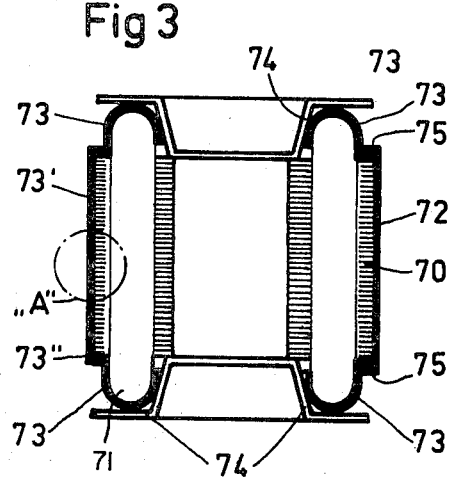
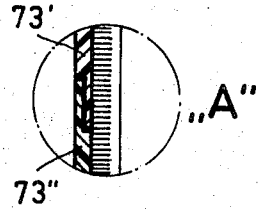
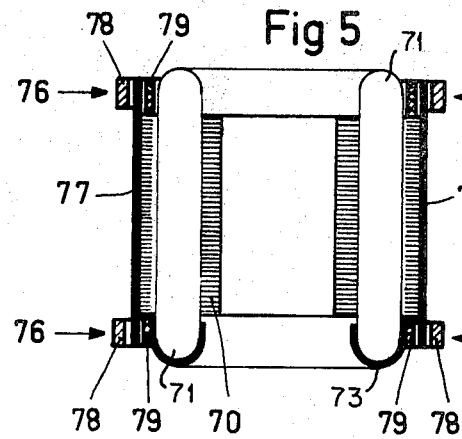
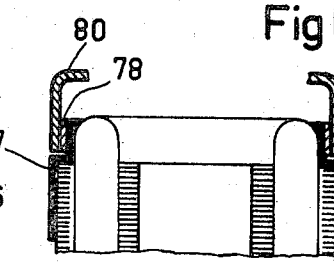
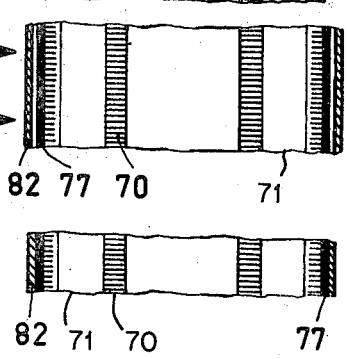
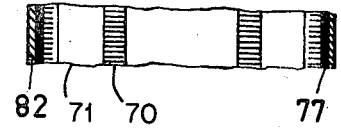

INTERNALLY INSULATED, METAL ENCLOSED ELECTRIC MOTOR

The present invention relates to an internally insulated electric motor construction, and more particularly to such a motor which is designed for enclosure by a metal housing, in which an outer stator surrounds a rotor, and the housing is completely insulated by insulation material, not only by air gaps, from any electrically or electromagnetically active components of the motor.

It is an object of the present invention to provide a motor structure, in which the motor is so insulated that it is still capable of dissipating any heat arising during motor operation, and yet can be manufactured at low cost.

SUBJECT MATTER OF THE PRESENT INVENTION

Briefly, the stator is completely covered at the outside by a layer of insulating material, in one form a sleeve of insulating material, which extends from end face to end face of the stator. The end loops of the stator windings are covered by means of pre-formed insulating caps which, together with the insulating layer at the outside of the stator, form a complete continuous insulating covering layer.

The insulating caps, in a preferred form, are made of glass fiber reinforced polyamide plastic. In order to fit tightly against other insulating material, such as for example an outer surrounding tube, they are shaped to provide a tight fit thereagainst, for example, by being formed with a shoulder, an edge, or the like.

The insulating caps, in a form of the invention, may be made with a surrounding edge shoulder which continues to form a cylindrical covering which surrounds the stator lamination stack and extends approximately up to its center. Two such cylindrical end caps and extension sleeves, when pushed over the stator, then provide for complete insulation of the entire stator assembly, that is, laminations and windings. Where these preformed end cap - sleeve assemblies meet, they can be shaped to provide an interengaging fit, which can be heat sealed, interconnected by adhesive, or the like to provide a secure interconnection.

The insulating sleeves are mechanically not very strong and, in accordance with a feature of the invention, can be surrounded by a metal sleeve which can be shrunk on the insulating sleeve by magnetic deformation or, for example, by squeezing together a longitudinal, axially extending bulge; or by an overlapping joint strip. The insulating arrangement itself can be so arranged that the insulating layers are formed with projecting edges to provide a longer path for any possible surface leakage currents, and to increase air gap distances.

The rotor can be insulated from the shaft by means of an insulating sleeve surrounding the rotor shaft, the sleeve preferably being formed with a conical or stepped flare at the end to further increase leakage paths and to provide for additional insulation material facing the ends of the motor. The end rings interconnecting current conducting bars of a squirrel cage motor can likewise be insulated by end caps or the like, set on the squirrel cage rotor, or on the projecting pins from the squirrel cage conductor bars. These end caps preferably are provided with ventilating fins or the like to improve ventilation of the motor.

The insulation material itself preferably includes crystalline inorganic materials, which improve the heat dissipation. It has been found that amorphous inorganic materials have a heat conductivity which is in the order of one thousand times worse than metal; crystalline inorganic materials, however, have a heat conductivity which is only about twenty times worse than metal. Suitable materials are crystallized anhydrous calcium carbonate, or crystalline magnesium oxide. The materials can be worked readily — in contrast to other inorganic materials.

Suitable choice of the insulation material permits substantial reduction in motor noise during operation.

The invention will be described by way of example with reference to the accompanying drawings, wherein:

FIG. 1a is a longitudinal transverse view through one half of a motor, illustrating the principle of the present invention;

FIG. 1b is a longitudinal transverse view through the other half of the motor of FIG. 1, illustrating a modified embodiment;

FIG. 2 is a highly schematic longitudinal view of one embodiment of the invention, applied to a stator;

FIG. 3 is a highly schematic illustration of another embodiment, and illustrating apparatus used in the process of insulating the stator;

FIG. 4 is a detail view of the stator;

FIG. 5 is a highly schematic view of the stator illustrating another embodiment;

FIG. 6 is a highly schematic view of a portion of the rotor illustrating another embodiment;

FIG. 7 illustrates a step in the manufacture of a metal-clad stator;

FIG. 8 illustrates the final metal-clad stator;

FIG. 9 is a transverse schematic view through a metal-clad stator;

FIG. 10 is a transverse sectional view through a stator in accordance with another embodiment of the invention; and FIG. 11 is a fragmentary schematic view illustrating insulation of a rotor.

The electromagnetically active portions of the motor are shown as stator lamination stack 21, placed in slots of the stator laminations, and the end loops 22 of the winding. The electromagnetically-active portions 21, 22 of the stator are covered by an insulating protective layer 23 to be insulated with respect to the housing 24 (FIG. 1a), and the end bell 24', 29' (FIG. 1b) respectively. The housing may be formed, as seen in FIG. 1b, with cooling ribs 25. The rotor has a lamination stack 26 (FIG. 1a, FIG. 11) and is insulated from shaft 28 by an insulating layer 27 which may, for example, be an insulating tube, in order to protect the electromagnetically active parts with respect to the remainder of the motor housing. As seen in FIG. 1b, the end bells 29' and 24' extend to the stator stack and form a unitary element with the remainder of the housing shell. The insulation which surrounds the stator, in the form illustrated in FIG. 1b, can be exposed beneath the end bells, particularly when protected from outside damage by the presence of circumferentially staggered mounting screws. A further insulation layer 23' can be placed on the outside between the housing end bells, to provide a double layer of insulation. The tube 27 surrounding the shaft preferably is formed with a flared end 127

(FIG. 11), conically expanded. The flared end need not be smoothly, conically expanded but can be stepped, as shown at the right-hand side of FIG. 11 at 127'. In the form illustrated, the rotor is a squirrel cage rotor having conductor bars 100 which are interconnected at their terminal ends by a short circuit ring 101. The short circuit ring may, additionally, be shaped to provide ventilating or fan blades 31 (FIG. 1a, FIG. 1b), or additional fan and ventilation blades may be secured to the rotor. The insulating tube 27, and particularly the flared ends 127 preferably extend throughout the axial distance of the entire rotor assembly, that is, beneath the rotor ventilating blades 31, to shield the portions of the rotor which are part of the electromagnetic circuit from the bearings 32 which, electrically, are connected to the housing. Since the insulating tube, with its flared end 127 will then be located between the end of the bearing 32 and the short circuit ring 101, or the short circuiting fan blades 31, the otherwise required air gap, to provide for sufficient insulation between bearing and short circuit rings, can be reduced. An insulating cap 102 located on the short circuit ring 101, or on projecting pins of the conductor bars 100, or secured to the fan blades 31 provides additional insulation. The end cap 102, itself, may be formed with radial ventilating blades (FIG. 11) or small openings 103 therein permitting passage of air therethrough, to provide for ventilation of the rotor while, simultaneously, permitting reduction of the axial length of the motor since the otherwise required air gap between the motor housing and the electromagnetically active parts of the rotor can be reduced.

The stator insulation is shown schematically in FIG. 2. A stator lamination stack 70 holds an electric winding 71. In order to provide for improved insulation to the outside, a sintered layer of insulation material 72 is provided at the outside of the stator lamination stack. This insulation layer may have a thickness of 1 mm or more, and may be formed of thermoplastics, thermosetting resins, applied by spraying, dipping, injection molding or the like. The insulation layer 72 is joined to end caps 73 surrounding the end loops of the winding. The end caps 73 are pre-formed and preferably are made of fiberglass reinforced polyamide plastics, made by injection molding, forming or the like. They are preferably shaped to have a circumferential sealing ring 75 (FIG. 3). The ring 75 is secured to outer insulation layer 72 which, preferably, is in form of a sleeve, by an adhesive, thermoplastic welding or the like.

To fill the space between the end caps and the windings completely with insulation material, a frustoconical sheet metal element 74 is introduced from both sides into the hollow space between the laminations. The conical sides of the elements 74 engage the inner sides of the insulating caps 73. Insulation material introduced into the space between the end caps and the windings 71 can then be drawn and compacted into this space by applying vacuum, through a source suitably connected to the stator (not shown). Alternatively, the entire stator can be placed into a vacuum injection mold, for vacuum injecting, or pressure injecting suitable insulation material between the windings and the stator lamellae, and the pre-formed end caps.

The end caps 73, in one form of the present invention, can be provided with cylindrically projecting extensions 73', so that the end caps and the cylindrical extensions will form a complete insulating assembly. Thus, the lower end cap 73 is formed with a cylindrical extension 73'' (FIG. 4) and the upper end cap 73 is formed with a cylindrical extension 73'. The two cylindrical extensions are relieved at their center, where they match, so as to overlap, as seen in the detail view of FIG. 4, where the detail illustrates within circle A the junction of the two end caps, the circle being placed as shown in FIG. 3. To assemble the end caps over the windings, it is only necessary to slip the end caps with their cylindrical extensions on the stator - winding assembly, and suitably interconnect the two extensions 73', 73'', for example by heat sealing, by plastic adhesives, or the like. The overlap of the two cylindrical extensions 73', 73'' (FIG. 4) provides for complete insulation and secure interconnection. A slight interference fit may also be used.

In accordance with the embodiment of FIG. 5, an insulating sleeve 77 is slipped over the stator lamination stack. The insulating sleeve extends beyond the stator stack, and up to just about the end of the winding loops. The winding loops are again covered by end caps 73, only the lower ones of which are shown. After placement of the sleeve, a metal end ring 78 is placed about the outside of the sleeve. Electromagnetic shrinking is then used by applying force, in direction of the arrows 76, against the rings 78 to shrink the rings 78 on the outer ends of the end caps. The magnetic forming method, itself, is well known. This secures the insulating sleeve 77 securely on the stator assembly. The metal ring 77 can also be shrunk, or worked concentrically to the stator stack, in such a manner that an outer end bell or cap 80 can then be applied thereto (FIG. 6), bell or cap 80 being of metal and carrying the end bells of the motor, or other portions thereof. The cap 80, itself, can be formed as the end bell of the motor and provided with a holder for the motor bearing.

The end loops of the windings 71 may be protected by inner insulating rings 79 (FIG. 5). These rings 79 protect the end caps 73, and thus the windings therein, against possibly excessive forces 76 which may arise during shrinking, and to permit the shrinking step to be carried out with a force acceptable to the end winding loops 71.

FIGS. 7 and 8 are fragmentary views of rotor structures; an insulating tube 77 is placed over the lamination stack 70 of the stator. An aluminum ring 82 surrounds the insulating sleeve 77. Radially directed forces 76 are again exerted against the aluminum ring, for example by magnetic forming, as schematically indicated; the aluminum ring or sleeve which is placed over the entire extent of the stator is shrunk against the insulating layer or sleeve 77, to securely connect the insulating sleeve 77 to the outside of the laminations, and the aluminum ring 82 thereover. FIG. 7 illustrates the application of sleeve 77 to the stator and the placement of aluminum sleeve 82 thereover before magnetic deformation; FIG. 8 illustrates, in fragmentary representation, the resulting product.

Placing of an insulating layer around a stator is easily accomplished when the insulating layer is a sleeve, particularly if it is of very slightly greater diameter than the stator; it, itself, can be shrunk on the stator by techniques well known in connection with heat shrinking of plastics. In accordance with a feature of the invention, the insulating layer can be an insulating foil 77' (FIG. 9) wrapped around the stator. Modern high-strength insulating foils permit application of one or several layers of such soils directly over stacked stator laminations. A tube 82', for example of aluminum is slipped over the foil-wrapped stator. Tube 82' is formed with axially extending bulges 83. Force is applied against the bulges 83, as indicated by arrows 87, to tightly clamp the tube 82' about the foil-insulated stator. The stator, then, regardless of whether insulated by foil or tube, is mechanically secured within the aluminum tube 82', and reliably electrically insulated therefrom.

FIG. 10 illustrates an embodiment of the invention, in which a sheet metal cover 182 is placed around a foil-insulated stator. The foil 177 extends around the stator, and is somewhat thicker, the ends of the foils overlapping at 84 and held together by adhesives, plastic welding or the like. The outer metal cover 182 has a sheet metal strip 85 secured thereto, for example by welding, to completely surround the stator. The gap between the ends of the cover 182 is preferably placed in the region of overlap 84 of the insulating strip 177 insulating the stator. The outer cover strip 85, after the cover 182 has been pulled tightly around the stator with the insulating foil 177 therein, is then secured to the other side of the metal cover 182, for example by spot welding or by means of modern adhesives, such as epoxy-type resins or the like. Adhesives can also be used to seal the seam of an open cover tube 182, to thereby avoid the use of the additional cover strip 85. If welding is difficult, for example due to the nature of the insulating material, resulting hot spots or the like, then a cover strip 85 is preferably first secured to the outside cover 182, and then the thus prepared cover and cover strip unit is assembled around the insulated stator, tightly fitted, and then the cover strip 85 is secured, mechanically, by interengaging notches, adhesives, and the like, to the other overlapped end of cover 182. The surfaces concentric to the stator lamination stack can be used as application surfaces for end bells of the motor (FIG. 1b) or the motor end bells can be placed against the outer cover unit and secured thereto, for example by screws, a spring clip (FIG. 1a), or the like.

The motor, insulated as described, can be easily made in mass production and permits rapid assembly. Heat is dissipated through the insulation material. The heat dissipation is improved, particularly if the minimum thickness of the insulation layer can be further reduced, for example upon change of insulation standards or requirements or upon development of more highly insulating material. The mechanically fragile insulating layers are completely protected by covers or cover shields which, simultaneously, can serve as attachment elements for the end bells and thus can take over the functions of a housing itself. Filling the space between the windings and pre-formed end caps with insulation material can be done in one operating step together with impregnating the windings and sealing them into the stator lamination stack. The partly conical element 74 (FIG. 3) can be pressed with a predetermined pressure, in axial direction, in order to seal the end space beneath the end caps and the windings to the fixture part 74. Preferably, the conical element 74 is so dimensioned that the free space between the conical surface thereof, the stator stack, the end caps, and the windings within the end caps is as small as possible. The winding, so sealed from the outside, is then soaked with an insulating material which hardens with time, or by chemical action, by means of vacuum. The insulating caps are thus simultaneously secured from the inside to the end loops of the windings, and the space between the caps and the end loops of the windings can be completely filled with insulating material.

Many safety requirements for protective insulation require an insulation layer of at least 1 mm thickness. Although the electrical properties of modern insulating foils permit use of even thinner foils, mechanical damage to very thin insulation foils may reduce their effective insulation thickness and therefore the requirements for a certain thickness of material of insulation layer has been maintained, although heat dissipation of the motor itself is reduced at such a thickness of insulation material. If the insulation layer applied over the stator stack is in form of a sleeve, then, in accordance with a preferred form, the sleeve should be applied to have a very slight play, that is, to be just slightly wider than the diameter of the stator laminations, to permit ease of assembly, and thereafter shrinking the insulation layer, or adhering an outer insulation ring (FIG. 5; FIGS. 6, 7 and 8) over the insulation sleeve for secure interconnection.

Various changes and modifications may be made within the inventive concept.

We claim:

1. Internally insulated electric motor having a stator stack formed of magnetic laminations, and windings therein, a housing, and a rotor;
    wherein a layer (23, 72, 73, 77', 177) of insulating material extends around the outside of the stator laminations, completely surrounding said stator laminations throughout their lengths from end face to end face of the stator at the outside thereof;
    and metal attachment means (78) are provided, located at the outside of the layer to secure the layer around the stator laminations,
    wherein the metal attachment means comprises a metal tube (82') located concentrically over the layer (77) of insulating material and placed over the stator laminations (70), said tube having an axially extending outwardly directed bulge (83) which is compressed to secure the tube over the layer of insulating material.

2. Motor according to claim 19, wherein pre-formed insulating end caps (73) are provided covering the end loops of the windings in the stator and forming, together with the insulating material, a continuous insulating covering layer, the end caps being formed with cylindrical extensions (73', 73''), covering the outside of the stator laminations and extending from opposite end caps towards each other to form, together, an insulating sleeve of said layer of insulating material.

3. Motor according to claim 2, wherein the terminal ends of the cylindrical extensions overlap each other.

4. Internally insulated electric motor having a stator stack formed of magnetic laminations, and windings therein, a housing, and a rotor;
    wherein a layer (23, 72, 73, 77', 177) of insulating material extends around the outside of the stator laminations, completely surrounding said stator laminations throughout their lengths from end face to end face of the stator at the outside thereof;
    and metal attachment means (78) are provided, located at the outside of the layer to secure the layer around the stator laminations,
    wherein the metal attachment means comprises a rolled sheet metal cover (182) surrounding the outside of the insulating layer (77) over the stator laminations (70);

and an overlapping axially extending cover strip (85) covering the junction between the ends of the sheet metal cover.

5. Motor according to claim 4, wherein the cover strip is secured to the rolled sheet metal cover by welding.

6. Motor according to claim 4, wherein the layer of insulating material is a rolled foil having overlapping ends (84), the ends being located at a region free from the rolled sheet metal cover, the cover strip covering the gap between the rolled metal cover and the overlapped ends of the foil.

7. Motor according to claim 1, wherein the rotor is a squirrel cage rotor, and ring-shaped caps (102) of insulating material and formed with ventilating means are located at the end face portions of the rotor.

8. Motor according to claim 4, wherein preformed insulating end caps (73) are provided covering the end loops of the windings in the stator and forming, together with the insulating material, a continuous insulating covering layer, the end caps being formed with cylindrical extensions (73', 73''), covering the outside of the stator laminations and extending from opposite end caps towards each other to form, together, an insulating sleeve of said layer of insulating material.

9. Motor according to claim 8, wherein the terminal ends of the cylindrical extensions overlap each other.

10. Motor according to claim 4, wherein the rotor is a squirrel cage rotor, and ring-shaped caps (102) of insulating material and formed with ventilating means are located at the end face portions of the rotor.

* * * * *